United States Patent
Ishida

(10) Patent No.: US 11,170,321 B2
(45) Date of Patent: Nov. 9, 2021

(54) LEARNING METHOD, PREDICTION METHOD, LEARNING DEVICE, PREDICTING DEVICE, AND STORAGE MEDIUM

(71) Applicant: FUJITSU LIMITED, Kawasaki (JP)

(72) Inventor: Tsutomu Ishida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 375 days.

(21) Appl. No.: 16/207,247

(22) Filed: Dec. 3, 2018

(65) Prior Publication Data

US 2019/0188598 A1 Jun. 20, 2019

(30) Foreign Application Priority Data

Dec. 15, 2017 (JP) .............................. JP2017-241179

(51) Int. Cl.
- *G06N 20/00* (2019.01)
- *G06N 3/04* (2006.01)
- *G06F 17/18* (2006.01)
- *G06N 3/08* (2006.01)

(52) U.S. Cl.
CPC ............. *G06N 20/00* (2019.01); *G06F 17/18* (2013.01); *G06N 3/04* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 2011/0208495 A1* | 8/2011 | Yuta | ........................ | G06F 17/18 703/2 |
| 2012/0284212 A1* | 11/2012 | Lin | ........................ | G06N 20/00 706/12 |
| 2015/0112900 A1* | 4/2015 | Ariyoshi | ................ | G06N 20/00 706/12 |
| 2015/0302318 A1* | 10/2015 | Chen | ........................ | G06F 17/18 706/12 |
| 2017/0004404 A1* | 1/2017 | Fujimura | ................ | G06N 20/00 |

FOREIGN PATENT DOCUMENTS

| JP | 2000-259223 | 9/2000 |
|---|---|---|
| JP | 2004-086896 | 3/2004 |

\* cited by examiner

*Primary Examiner* — Alexey Shmatov
*Assistant Examiner* — Hamza R Mughal
(74) *Attorney, Agent, or Firm* — Fujitsu Patent Center

(57) ABSTRACT

A non-transitory computer-readable storage medium storing a program that causes a computer to execute a process, the process includes learning a learning model using a first training data group obtained by excluding a test data group from a plurality of training data items; calculating prediction accuracy of the learning model using the test data group; and when the prediction accuracy satisfies the predetermined requirement, learning an error prediction model for determining whether an error of a value predicted by the learning model satisfies a predetermined requirement, by using a second training data group obtained by excluding the test data group and the first training data group from the plurality of training data items.

12 Claims, 9 Drawing Sheets

FIG. 2

| COMPONENT | PRICE | SURFACE AREA | HOLE DIAMETER | ALLOWABLE UPPER LIMIT |
|---|---|---|---|---|
| A | 1000 | 50 | 5 | 1.2 |
| B | 1500 | 60 | 5 | 1 |
| C | 8000 | 50 | 4 | 0.2 |
| ... | ... | ... | ... | ... |

| COMPONENT | TRUE PRICE | PREDICTED VALUE | ERROR | MAGNITUDE OF ERROR |
|---|---|---|---|---|
| C | 8000 | 2000 | -75.0% | 0 |
| F | 1900 | 1900 | -5.0% | 1 |
| K | 2800 | 2800 | -6.7% | 1 |
| ... | ... | ... | ... | ... |

LEARNING METHOD, PREDICTION METHOD, LEARNING DEVICE, PREDICTING DEVICE, AND STORAGE MEDIUM

CROSS-REFERENCE TO RELATED APPLICATION

This application is based upon and claims the benefit of priority of the prior Japanese Patent Application No. 2017-241179, filed on Dec. 15, 2017, the entire contents of which are incorporated herein by reference.

FIELD

The embodiment discussed herein is related to a learning program, a prediction program, a learning method, a learning method, a prediction method, a learning device, and a predicting device.

BACKGROUND

The cost of manufacturing components may vary depending on details of processing in the manufacture of the components. Since the details of the processing of the individual components are clarified upon the manufacture of the components, it is requested to execute value prediction to predict the cost of manufacturing the components and a related cost upon price estimation conducted in order to receive an order of the components.

In value prediction such as price estimation conducted for an order of components, an estimated price is predicted using a prediction model based on characteristic amounts such as a height of a protrusion, a shape of a hole, an area, and an allowable tolerance limit. Regarding the prediction model (hereinafter also referred to as learning model) for the value prediction, a technique for relearning the prediction model and updating the model to build a highly accurate prediction model when an error of a predicted value output from the prediction model is large is known. As related art, Japanese Laid-open Patent Publication No. 2004-86896, Japanese Laid-open Patent Publication No. 2000-259223, and the like have been disclosed, for example.

The aforementioned conventional technique, however, has a problem that even when the accuracy of the learning model is improved, an error of a value predicted using the learning model for data targeted for prediction may not be accurately predicted.

For example, in the estimation of the price of a component, when an allowable tolerance limit exceeds a certain value, a manufacturing process and a processing method may be different from a normal manufacturing process and a normal processing method, and a predicted value of an estimated price may be largely different from a true value. Thus, how much a value predicted using the learning model is reliable is determined by an experienced person or the like who is familiar with a process of manufacturing the component. Under such circumstances, it is desirable that the learning model be learned and an error of a value predicted using the learning model be determined.

SUMMARY

According to an aspect of the embodiments, a non-transitory computer-readable storage medium storing a program that causes a computer to execute a process, the process includes learning a learning model using a first training data group obtained by excluding a test data group from a plurality of training data items; calculating prediction accuracy of the learning model using the test data group; and when the prediction accuracy satisfies the predetermined requirement, learning an error prediction model for determining whether an error of a value predicted by the learning model satisfies a predetermined requirement by using a second training data group obtained by excluding the test data group and the first training data group from the plurality of training data items.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram describing an example of sample data;

FIG. 4 is a diagram describing training data on the generation of an error prediction model;

DESCRIPTION OF EMBODIMENTS

Hereinafter, a learning program, prediction program, learning method, prediction method, learning device, and predicting device according to an embodiment are described. Configurations that have the same function in the embodiment are indicated by the same reference symbol, and a duplicated description is omitted. The learning program, the prediction program, the learning method, the prediction method, the learning device, and the predicting device, which are described below in the embodiment, are examples and do not limit the embodiment. Two or more of configurations described in the embodiment may be combined without contradiction, and two or more of processes described in the embodiment may be combined without contradiction.

Figure 1:
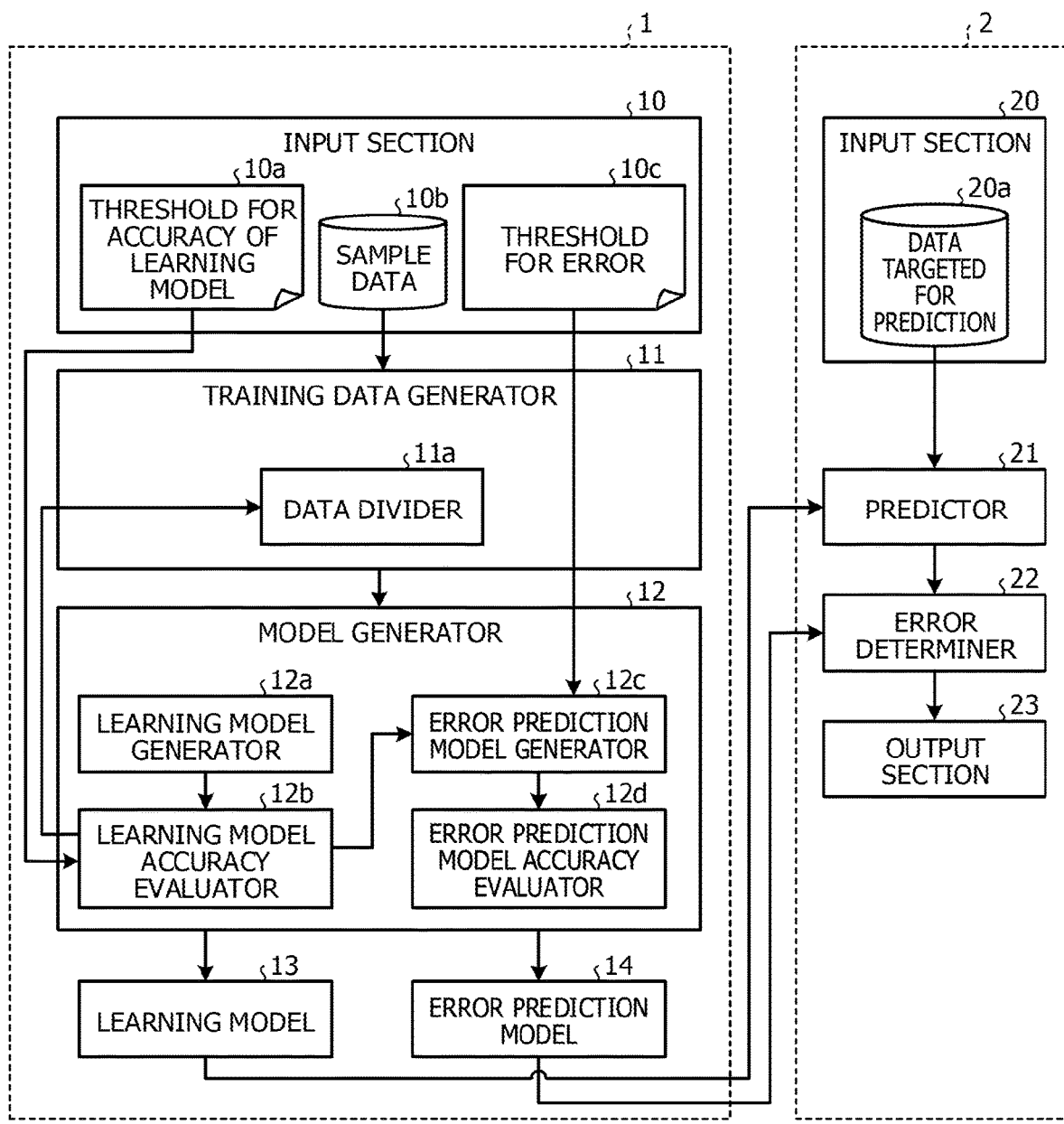
FIG. 1 is a block diagram exemplifying a functional configuration of a learning device according to an embodiment and a functional configuration of a predicting device according to the embodiment.

FIG. 1 is a block diagram exemplifying a functional configuration of the learning device according to the embodiment and a functional configuration of the predicting device according to the embodiment. As illustrated in FIG. 1, the learning device 1 learns (generates) a learning model 13 and an error prediction model 14 that use sample data 10b storing records of orders of components as multiple training data items and are used to predict prices of components to be ordered. The predicting device 2 uses the learning model 13 learned by the learning device 1 and the error prediction model 14 learned by the learning device 1 to output prediction results indicating prices or the like for data 20a targeted for prediction and including characteristics of new components.

The embodiment exemplifies a configuration in which the learning device 1 for learning the learning model 13 and the error prediction model 14 is separated from the predicting device 2 for using the learning model 13 learned by the learning device 1 and the error prediction model 14 learned by the learning device 1 to obtain prediction results from the data 20a targeted for prediction. The learning device 1 and the predicting device 2 may not be separated from each other and may be enabled as an information processing device having functions of the learning device 1 and functions of the predicting device 2.

Although the embodiment describes the case where prices of components to be ordered are predicted in value prediction, the embodiment is not limited to the prediction of prices of components. For example, the embodiment may be applied to various types of value prediction such as the prediction of a deadline of a component to be ordered and the prediction of stock prices.

The learning device 1 includes an input section 10, a training data generator 11, and a model generator 12. The input section 10 receives, as input data, a threshold 10a for the accuracy of the learning model 13, the sample data 10b serving as the origin of training data, and a threshold 10c for an error predicted using the error prediction model 14.

The threshold 10a is used for a value (for example, a determination coefficient) indicating the accuracy in which an explanatory variable of the learning model 13 explains a variable (target variable) to be explained.

The threshold 10c is used to define a range (magnitude) of an error upon the learning of the error prediction model 14. For example, when ±10% of a true price are used to determine an error as a large error or a small error, ±10% of the true price are used as the threshold 10c.

FIG. 2 is an explanatory diagram illustrating an example of the sample data 10b. As illustrated in FIG. 2, the sample data 10b indicates prices of components obtained according to past orders and characteristic amounts (surface areas, hole diameters, allowable upper limits, and the like) of the components.

The training data generator 11 generates, based on the sample data 10b input from the input section 10, training data (group) to be used to learn the learning model 13 and the error prediction model 14. Specifically, the training data generator 11 uses, as training data (group), data obtained by excluding test data (group) for validation from the sample data 10b. The training data generator 11 includes a data divider 11a configured to divide the training data into two groups, training data for the learning model 13 and training data for the error prediction model 14. The division of the training data and the test data may be arbitrary. For example, the training data may be 80% of the sample data 10b, the test data may be 20% of the sample data 10b, and the training data and the test data may be randomly assigned.

Figure 3:
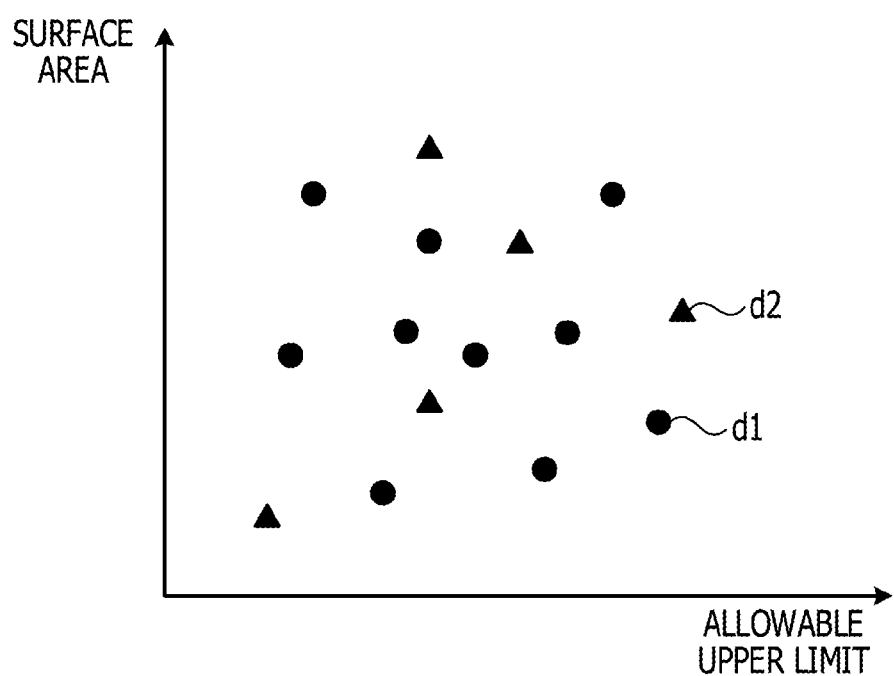
FIG. 3 is a diagram describing the generation of training data.

FIG. 3 is a diagram describing the generation of the training data. In FIG. 3, an abscissa indicates allowable upper limits included in the characteristic amounts of the components, an ordinate indicates surface areas included in the characteristic amounts of the components, and the data (all the training data) included in the sample data 10b and indicating all the components are plotted.

As illustrated in FIG. 3, the data divider 11a randomly selects data from the data included in the sample data 10b and indicating all the components and generates training data d1 (indicated by black circles in FIG. 3) for the learning model 13 and training data d2 (indicated by black triangles in FIG. 3) for the error prediction model 14.

The data divider 11a initially uses an arbitrarily set value as a ratio of the training data d1 into which the sample data 10b is divided to the training data d2 into which the sample data 10b is divided. Then, when the learning model accuracy evaluator 12b evaluates that prediction accuracy of the learning model 13 does not satisfy a predetermined requirement, the data divider 11a divides the sample data 10b into the training data d1 and d2 again so that the ratio of the training data d1 to the sample data 10b is increased.

The model generator 12 is a functional section for executing processing related to the learning of the learning model 13 and the learning of the error prediction model 14. The model generator 12 includes a learning model generator 12a, a learning model accuracy evaluator 12b, an error prediction model generator 12c, and an error prediction model accuracy evaluator 12d.

The learning model generator 12a generates the learning model 13 by supervised learning using learning data included in the training data d1 for the learning model 13. Specifically, the learning model generator 12a uses a method to generate the learning model 13 for predicting prices from characteristic amounts. In this case, the method is, for example, regression analysis to be executed using prices and characteristic amounts, indicated in the learning data, of components, Support Vector Regression (SVR), or the like.

For example, when linear regression is used, the learning model generator 12a calculates $w_k$ and C using the following Equation (1). In Equation (1), $p_i$ is a target variable and indicates a price of a component (i), $w_k$ is a weight for a characteristic amount (k), $x_{ik}$ is an explanatory variable and indicates a value of a characteristic amount (k) of a component (i), and C is a constant term.

$$p_i = \sum_k w_k x_{ik} + C \qquad (1)$$

The learning model accuracy evaluator 12b substitutes the test data into the generated learning model 13 and evaluates the recall (prediction accuracy) of prices from characteristic amounts in the learning model 13. Specifically, the learning model accuracy evaluator 12b executes cross-validation using the test data, thereby calculating a determination coefficient ($R^2$) indicating the prediction accuracy of the learning model 13.

Then, the learning model accuracy evaluator 12b evaluates the learning model 13 based on whether or not the calculated determination coefficient ($R^2$) exceeds the input threshold 10a. When the prediction accuracy exceeds the threshold 10a, the learning model accuracy evaluator 12b notifies the error prediction model generator 12c that the prediction accuracy of the learning model 13 satisfies the input requirement. After receiving the notification, the error prediction model generator 12c generates the error prediction model 14.

When the prediction accuracy does not exceed the threshold 10a, the learning model accuracy evaluator 12b notifies the data divider 11a that the prediction accuracy of the learning model 13 does not satisfy the predetermined requirement. After receiving the notification, the data divider 11a divides the sample data 10a into the training data d1 and d2 again so that the ratio of the training data d1 to the sample data 10b is increased.

The error prediction model generator 12c generates the error prediction model 14 for using the training data d2 among the training data based on the sample data 10b to determine whether or not an error of a value predicted by the learning model 13 satisfies the requirement for the input threshold 10c.

Specifically, the error prediction model generator 12c predicts a price by substituting learning data included in the training data d2 for the error prediction model 14 into the learning model 13. Then, the error prediction model generator 12c compares a true price indicated by the learning data with the value predicted by the learning model 13 and calculates an error of the predicted value with respect to the true price. Then, when the calculated error is in a range indicated by the threshold 10c (for example, in a range of ±10% of the true price), the error prediction model generator 12c adds, to the training data d2, a flag (1) indicating that the calculated error is in the range indicated by the threshold 10c. When the calculated error is not in the range indicated by the threshold 10c, the error prediction model generator 12c adds, to the training data d2, a flag (0) indicating that the calculated error is not in the range indicated by the threshold 10c. Then, the prediction model generator 12c determines whether the error is large or small. Each flag may not be binary and may be multivalued (or indicate the range of ±10% of a true price, a range of ±10% to ±20% of the true price, a range of ±20% to ±30% of the true price, . . . ).

Then, the error prediction model generator 12c generates the error prediction model 14 for executing class classification on binary values (magnitude of errors) by supervised learning using, as the training data for the error prediction model 14, the training data d2 indicating that each error is determined as a large error (0) or a small error (1).

FIG. 4 is a diagram describing the training data for the generation of the error prediction model 14. As illustrated in FIG. 4, errors of values predicted by the learning model 13 and flags indicating whether the errors are large (0) or small (1) are added to training data 10d on the generation of the error prediction model 14.

The error prediction model generator 12c generates, based on the training data 10d illustrated in FIG. 4 and including the flags indicating determined errors, the error prediction model 14 by using a method such as deep learning using a multilayered neural network.

As an example, in deep learning, backpropagation is used in supervised learning. In this backpropagation, the error prediction model generator 12c causes the error prediction model 14 to propagate characteristic amounts (surface areas, hole diameters, allowable upper limits, . . . ), included in the training data 10d, of components in a forward direction and recognize the characteristic amounts. Then, the error prediction model generator 12c compares errors of predicted values obtained from output of the error prediction model 14 and the magnitude of the errors with correct solutions (training data 10d) and calculates errors (with respect to the correct solutions). Then, the error prediction model generator 12c causes the error prediction model 14 to propagate errors of the results of the recognition with respect to the correct solutions in a direction opposite to the forward direction used upon the recognition, changes parameters of layers of the multilayered neural network of the error prediction model 14, and approximates the parameters to optimal solutions.

As data to be input to the error prediction model 14, characteristic amounts that are CAD data of the components or the like and different from those to be used for price prediction may be used. In this manner, by using characteristic amounts different from those to be used for the price prediction, the error prediction model 14 may be learned independently of the learning model 13 for the value prediction.

Figure 5:
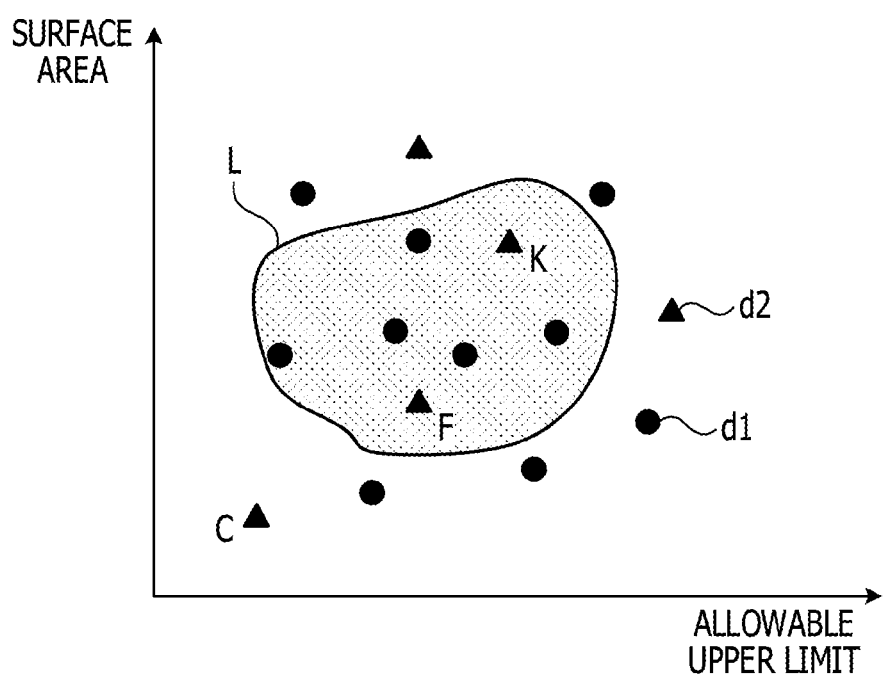
FIG. 5 is a diagram describing class classification by an error prediction model.

FIG. 5 is a diagram describing the class classification by the error prediction model 14. As illustrated in FIG. 5, a boundary line L to be used to classify errors of predicted values of prices based on the magnitude of the errors is calculated for characteristic amounts (surface surfaces and allowable upper limits in the example illustrated in FIG. 5) by generating the error prediction model 14. In the example illustrated in FIG. 5, the boundary line L that indicates ranges of ±10% of predicted values of prices of components (C, F, K, . . . ) indicated in the training data 10d illustrated I FIG. 4 is obtained.

The error prediction model accuracy evaluator 12d substitutes the test data into the generated error prediction model 14 and evaluates the recall (or the accuracy of predicting errors) of errors from characteristic amounts in the error prediction model 14. Specifically, the error prediction model accuracy evaluator 12d executes cross-validation using the test data to calculate accuracy indicating error prediction accuracy of the error prediction model 14. Although the embodiment exemplifies a configuration for calculating the accuracy, the error prediction accuracy of the error prediction model 14 may not be limited to the accuracy. F-measures (F values) or the like may be used as the error prediction accuracy of the error prediction model 14.

Then, the error prediction model accuracy evaluator 12d evaluates the error prediction model 14 based on whether or not the calculated accuracy exceeds a preset threshold. When the error prediction accuracy exceeds the threshold, the error prediction model accuracy evaluator 12d notifies the error prediction model generator 12c that the error prediction accuracy satisfies the predetermined requirement. After receiving the notification, the error prediction model generator 12c terminates the generation of the error prediction model 14.

When the error prediction accuracy does not exceed the threshold, the error prediction model accuracy evaluator 12d notifies the error prediction model generator 12c that the error prediction accuracy does not satisfy the predetermined requirement. After receiving the notification, the error prediction model generator 12c changes the threshold defining a range (magnitude) of the error. Specifically, when the prediction accuracy of the error prediction model 14 does not satisfy the predetermined requirement, the error prediction model generator 12c relaxes the requirement for the error of a predicted value. As an example, the error prediction model generator 12c increases a range of the error with respect to a true value (for example, increase the range from a range of ±10% of the true value to a range of ±20% of the true value).

The predicting device 2 includes an input section 20, an predictor 21, an error determiner 22, and an output section 23. The input section 20 receives input data 20a targeted for prediction.

The predictor 21 inputs the input data 20a targeted for prediction to the learning model 13 generated (learned) by the learning device 1 and acquires a predicted value (price of a component). The error determiner 22 inputs the data 20a targeted for prediction to the error prediction model 14 generated by the learning device 1 and acquires a result (result of classifying an error of a predicted price based on the magnitude of the error) of determining the error of the predicted value.

The output section 23 outputs the value predicted by the predictor 21 and the result of determining the error of the predicted value by the error determiner 22 to a display so that the display displays the output predicted value and the output result. Alternatively, the output section 23 may output the predicted value and the result so that the output predicted value and the output result are printed on a paper medium or the like. Alternatively, the output section 23 may output the predicted value and the result as a file or the like.

Figure 6:
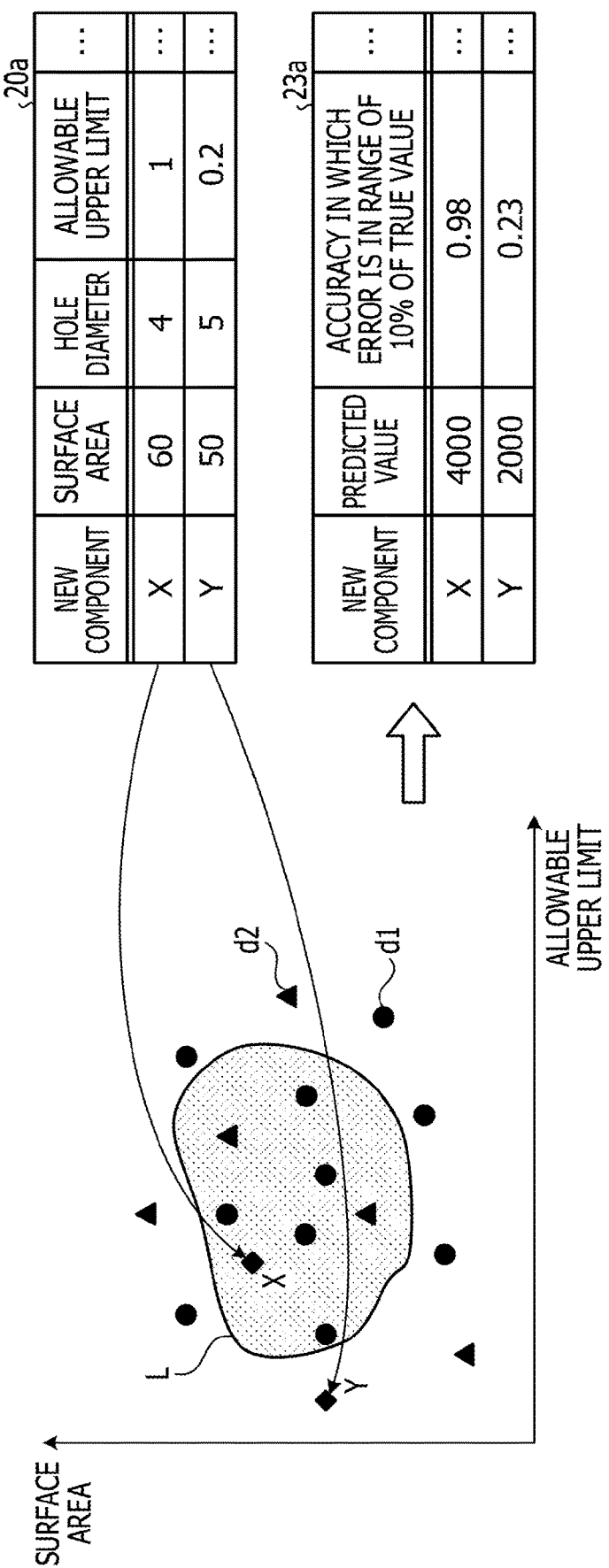
FIG. 6 is a diagram describing prediction results in an prediction phase.

FIG. 6 is a diagram describing prediction results in an prediction phase. As illustrated in FIG. 6, in the prediction phase by the predicting device 2, the data 20a targeted for prediction and indicating characteristic amounts of new components (X and Y) is input to the predicting device 2. The predicting device 2 acquires prices of the new components (X and Y) using the learning model 13. The predicting device 2 acquires results (accuracy of ranges of ±10% of true prices) of determining errors of the prices predicted by the error prediction model 14.

Then, the predicting device 2 outputs data including the predicted prices (predicted values) of the new components (X and Y) and the results (accuracy of ranges of ±10% of true prices) of determining the errors for the new components (X and Y).

A user may confirm, from the output data 23a, the prices predicted for the data 20a targeted for prediction and the results of determining the errors of the predicted prices. For example, the user recognizes that an estimated price of the component X is 4000 yen and that the accuracy (probability) in which an error of the predicted price of the component X is in a range of ±10% of a true price is 0.98 that is close to 1 (or high). The user also recognizes that an estimated price of the component Y is 2000 yen and that the accuracy (probability) in which an error of the predicted price of the component Y is in a range ±10% of a true price is 0.23 that is close to 0 (or low).

The accuracy (probability) in which results of determining errors are within the boundary line L indicating the ranges of ±10% of true prices as illustrated in FIG. 6 may be calculated and output. In addition, the magnitude of the errors (for example, whether or not the results are in the ranges of ±10% of the true prices) may be indicated by flags. The accuracy may not be limited to the example illustrated in FIG. 6.

Figure 7:
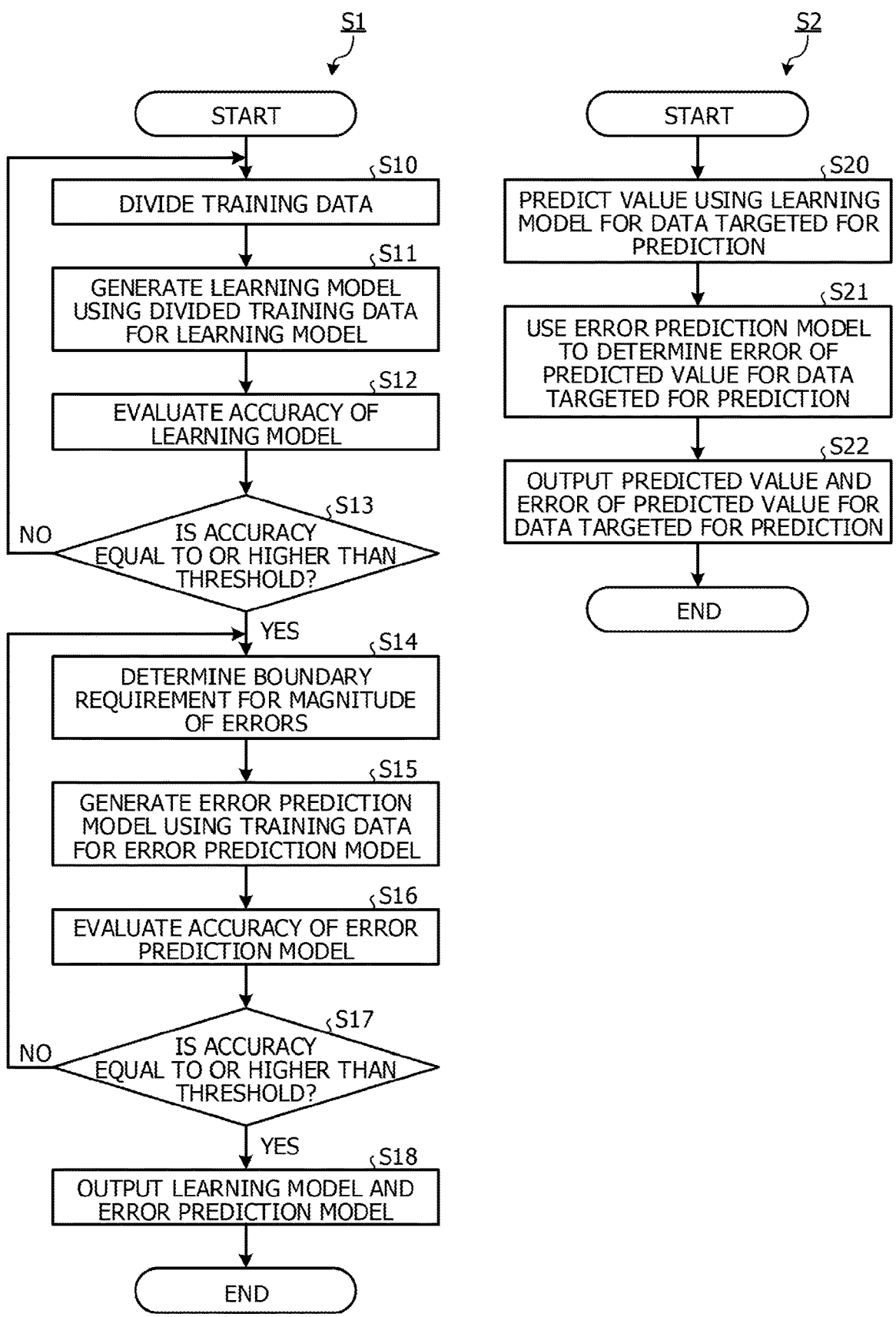
FIG. 7 is a flowchart of an example of a process including a learning phase and the prediction phase.

A process (learning phase) to be executed by the learning device 1 and a process (prediction phase) to be executed by the predicting device 2 are described below. FIG. 7 is a flowchart of an example of a process including the learning phase (S1) and the prediction phase (S2).

As illustrated in FIG. 7, when the learning phase (S1) is started, the data divider 11a divides the input sample data 10b into the training data d1 for the learning model 13 and the training data d2 for the error prediction model 14 (in S10). Then, the learning model generator 12a generates the learning model 13 using the learning data included in the divided training data d1 among the training data (in S11).

Then, the learning model accuracy evaluator 12b uses the test data to evaluate the accuracy (determination coefficient) of the learning model 13 (in S12). After that, the learning model accuracy evaluator 12b determines whether or not the accuracy of the learning model 13 is equal to or higher than the threshold 10a (in S13).

When the accuracy of the learning model 13 is lower than the threshold 10a (NO in S13), the learning model accuracy evaluator 12b notifies the data divider 11a that the prediction accuracy of the learning model 13 does not satisfy the predetermined requirement, and the learning model accuracy evaluator 12b returns the process to the process of S10. Thus, the data divider 11a divides the sample data 10b into the training data d1 and d2 again so that the ratio of the training data d1 to the sample data 10b is increased.

When the accuracy of the learning model 13 is equal to or higher than the threshold 10a (YES in S13), the error prediction model generator 12c determines a boundary requirement for the magnitude of errors (in S14). The boundary requirement is to be used for the generation of the error prediction model 14.

Specifically, the error prediction model generator 12c treats the input threshold 10c as the boundary requirement for the magnitude of errors. Alternatively, the error prediction model generator 12c may determine the boundary requirement for the magnitude of errors based on the amount (number of samples) of the training data d2. For example, when the number of samples included in the training data d2 is equal to or larger than a predetermined value and is sufficient, the error prediction model generator 12c reduces a range of an error (to, for example, a range of ±10% of a true value). On the other hand, when the number of samples included in the training data d2 is smaller than the predetermined value and is not sufficient, the error prediction model generator 12c increases the range of the error (to, for example, a range of ±20% of the true value).

Then, the error prediction model generator 12c generates the error prediction model 14 for using the training data d2 to determine whether or not an error of a value predicted by the learning model 13 satisfies the boundary requirement determined in S14 (in S15).

Then, the error prediction model accuracy evaluator 12d uses the test data to evaluate the accuracy or the error prediction accuracy of the error prediction model 14 (in S16). Then, the error prediction model accuracy evaluator 12d determines whether or not the accuracy of the error prediction model 14 is equal to or higher than the preset threshold (in S17).

When the accuracy of the error prediction model 14 is lower than the preset threshold (NO in S17), the error prediction model accuracy evaluator 12d notifies the error prediction model generator 12c that the error prediction accuracy of the error prediction model 14 does not satisfy the predetermined requirement, and the error prediction model accuracy evaluator 12d causes the process to return to the process of S14. Thus, the error prediction model generator 12c relaxes the boundary requirement for errors of predicted values. As an example, the error prediction model generator 12c increases the range of the error with respect to the true value (for example, increases the range from the range of ±10% of the true value to the range of ±20% of the true value).

When the accuracy of the error prediction model 14 is equal to or higher than the preset threshold (YES in S17), the model generator 12 outputs the generated learning model 13 and the generated error prediction model 14 to the predicting device 2 or the like (in S18).

When the prediction phase (S2) is started, the predictor 21 uses the generated learning model 13 to predict a value (price) for the input data 20a targeted for prediction (in S20). Then, the error determiner 22 uses the generated error prediction model 14 to determine an error of the predicted value for the input data 20a targeted for prediction (in S21). Then, the output section 23 outputs data 23a including the predicted value for the input data 20a targeted for prediction and the error of the predicted value (in S22).

As described above, the learning device 1 includes the learning model generator 12a, the learning model accuracy evaluator 12*b*, and the error prediction model generator 12*c*. The learning model generator 12*a* learns the learning model 13 using a first training data (d1) group obtained by excluding a test data group from multiple training data items. The learning model accuracy evaluator 12*b* uses the test data group to calculate the prediction accuracy of the learning model 13. When the prediction accuracy of the learning model 13 satisfies the predetermined requirement, the error prediction model generator 12*c* uses a second training data (d2) group obtained by excluding the test data group and the first training data group from the multiple training data items to learn the error prediction model 14 for determining whether or not an error of a value predicted by the learning model 13 satisfies the predetermined requirement. As described above, since the learning model 13 and the error prediction model 14 are learned using input multiple training data items, the learning model 13 may be learned so that the prediction accuracy of the learning model 13 satisfies the predetermined requirement. In addition, an error of a value predicted by the learning model 13 for data targeted for prediction may be determined using the error prediction model 14.

In the learning device 1, the accuracy of determining an error of a predicted value by the error prediction model 14 may be improved by learning the learning model 13 so that the prediction accuracy of the learning model 13 satisfies the predetermined requirement.

Figure 8:
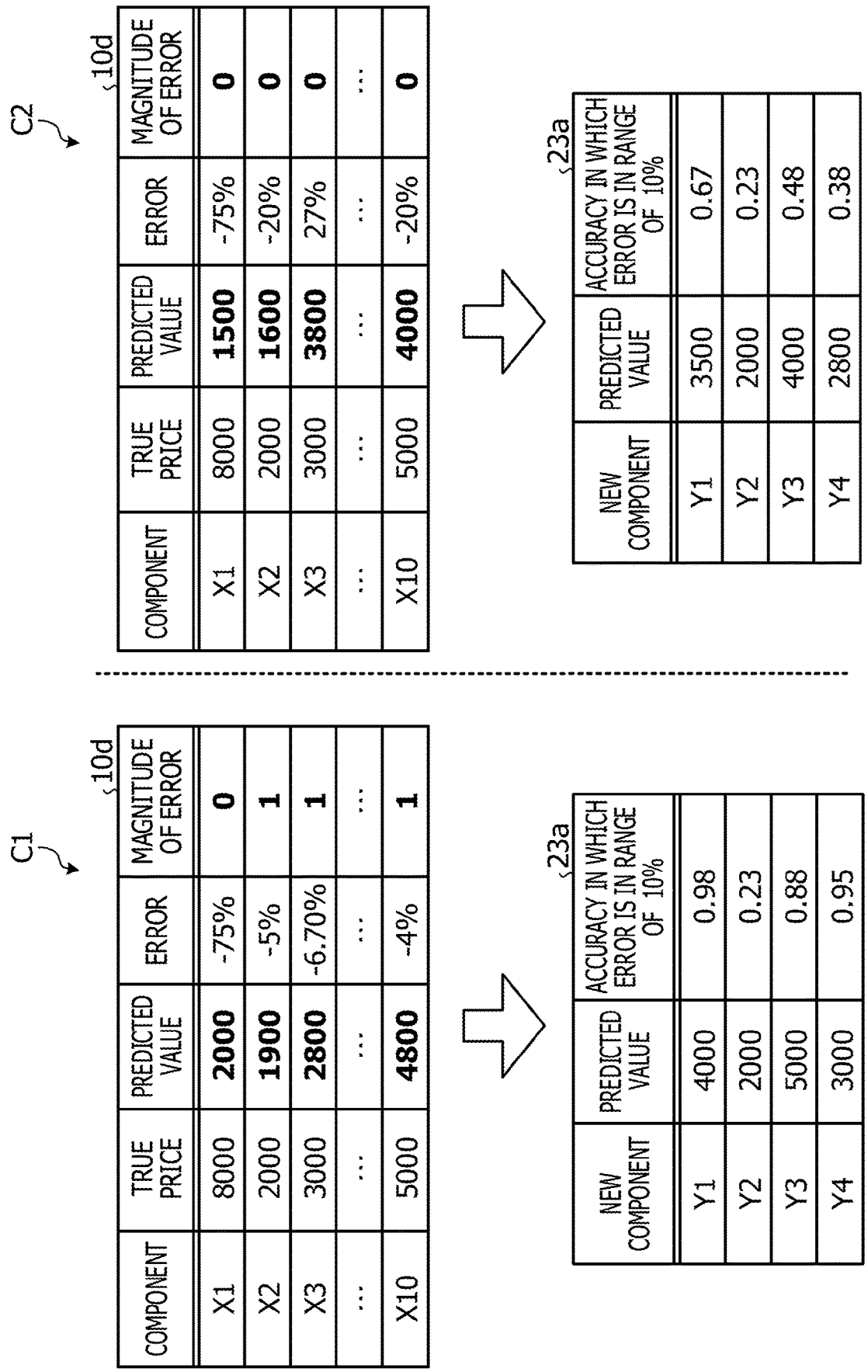
FIG. 8 is a diagram describing variations in the accuracy of a learning model.

FIG. 8 is a diagram describing variations in the accuracy of the learning model 13. In FIG. 8, a case C1 indicates the case where the accuracy of the learning model 13 is improved so that the prediction accuracy of the learning model 13 satisfies the predetermined requirement. In FIG. 8, a case C2 indicates the case where the accuracy of the learning model 13 is not improved and is lower than that in the case C1 so that the prediction accuracy of the learning model 13 does not satisfy the predetermined requirement.

As illustrated in FIG. 8, in the case C1, the accuracy of the learning model 13 is high and an error of a value predicted by the learning model 13 is small in many cases. Thus, a flag (0) indicating a large error or a flag (1) indicating a small error may be accurately added to the training data 10*d* to be used for the generation of the error prediction model 14, and the error prediction model 14 may be generated with high accuracy. Thus, in the output data 23*a* obtained using the learning model 13 and the error prediction model 14 for the data 20*a* targeted for prediction, the accuracy of predicted values (predicted prices) of new components and the accuracy of results of determining errors of the predicted values may be high.

In the case C2, the accuracy of the learning model 13 is lower than that in the case C1, and an error of a value predicted by the learning model 13 is large in many cases. Thus, in the case C2, a large number of flags (0) indicating large errors may be added to the training data 10*d* to be used for the generation of the error prediction model 14, and the accuracy of the generated error prediction model 14 may be low. Thus, in the output data 23*a* obtained using the learning model 13 and the error prediction model 14 for the data 20*a* targeted for prediction, the accuracy of results of determining errors of predicted values may be low.

The predicting device 2 includes the input section 20, the predictor 21, the error determiner 22, and the output section 23. The input section 20 receives the input data 20*a* targeted for prediction. The predictor 21 inputs the input data 20*a* targeted for prediction to the learning model 13 learned using the first training data group obtained by excluding the test data group from the multiple training data items. The predictor 21 acquires a predicted value for the input data. The error determiner 22 inputs the data 20*a* targeted for prediction to the error prediction model 14 for determining whether or not an error of a value predicted by the learning model 13 learned using the second training data group obtained by excluding the test data group and the first training data group from the multiple training data items satisfies the predetermined requirement. The error determiner 22 acquires a result of determining the error of the predicted value for the input data. The output section 23 outputs the acquired predicted value and the result of determining the error of the predicted value. Thus, the user may confirm the predicted value for the data 20*a* targeted for prediction and the result of determining the error of the predicted value.

For example, in the estimation of the price of a component, a predicted value of an estimated price and a true value of the price may be different from each other depending on a characteristic such as an allowable tolerance limit, and it may be requested that an experienced person or the like who is familiar with a process of manufacturing the component determine the predicted value. On the other hand, a user of the predicting device 2 may easily confirm, based on a result of determining an error of a predicted value, how much a value predicted for the data 20*a* targeted for prediction is reliable.

When the prediction accuracy calculated by the learning model accuracy evaluator 12*b* does not satisfy the predetermined requirement, the learning model generator 12*a* increases a ratio of data that is included in the multiple training data items and is to be used to learn the learning model 13. Since the number of samples included in the training data for the learning model 13 is increased by an increase in the ratio of the data to be used to learn the learning model 13, the prediction accuracy of the learning model 13 may be improved.

The error prediction model generator 12*c* determines the requirement for an error of a predicted value based on the amount of the second training data group. For example, when the amount of the training data d2 for the error prediction model 14 or the number of samples is equal to or larger than a predetermined value, the error prediction model generator 12*c* may generate the error prediction model 14 with high accuracy and reduces a range of an error with respect to a true value (to, for example, a range of ±10% of the true value). When the amount of the training data d2 for the error prediction model 14 is smaller than the predetermined value, the error prediction model generator 12*c* increases the range of the error with respect to the true value (to, for example, a range of ±20% of the true value). In this manner, the error prediction model generator 12*c* may change the requirement for an error of a predicted value based on the amount of the training data for the error prediction model 14.

The learning device 1 includes the error prediction model accuracy evaluator 12*d* for using the test data to calculate the prediction accuracy of the error prediction model 14. When the calculated prediction accuracy of the error prediction model 14 does not satisfy the predetermined requirement, the error prediction model generator 12*c* changes the requirement for an error of a predicted value. For example, when the prediction accuracy of the error prediction model 14 does not satisfy the predetermined requirement, the error prediction model generator 12*c* relaxes the requirement for an error of a predicted value. Specifically, the error prediction model generator 12*c* increases a range of an error with respect to a true value (from a range of ±10% of the true value to a range of ±20% of the true value). Since the error prediction model generator 12c changes the requirement for an error of a predicted value when the prediction accuracy of the error prediction model 14 does not satisfy the predetermined requirement, it may be possible to suppress a reduction, causing an error determined as a small error to be out of a range of ±10% of a true value, in the prediction accuracy of the error prediction model 14.

The constituent elements of the devices illustrated in the drawings may not be physically configured as illustrated in the drawings. Specifically, specific forms of the distribution and integration of the devices may not be limited to those illustrated in the drawings, and all or arbitrary one or more of the devices may be functionally or physically distributed or integrated in arbitrary units based on various loads and usage statuses.

All or arbitrary one or more of the various processing functions to be executed by the learning device 1 and the predicting device 2 may be executed by a CPU (or a microcomputer such as an MPU or an MCU (micro controller unit)). All or arbitrary one or more of the various processing functions may be executed by a program analyzed and executed by the CPU (or the microcomputer such as the MPU or the MCU) or hardware with wired logic. The various processing functions to be executed by the learning device 1 and the predicting device 2 may be executed by causing multiple computers to collaborate with each other via cloud computing.

Figure 9:
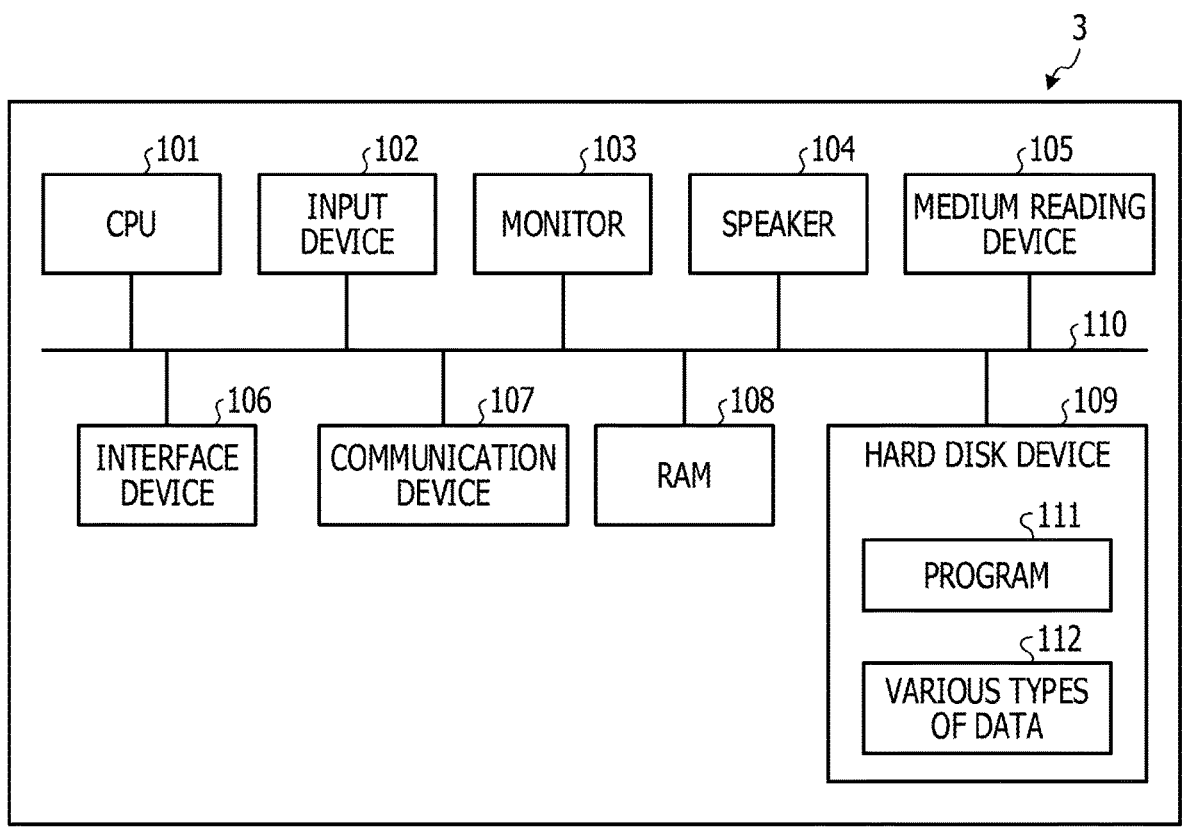
FIG. 9 is an diagram illustrating an example of a computer configured to execute a program.

The processes described in the aforementioned embodiment may be executed by causing a computer to execute a program prepared in advance. An example of the computer (hardware) configured to execute the program having the same functions as those described in the embodiment is described below. FIG. 9 is a diagram illustrating the example of the computer configured to execute the program.

As illustrated in FIG. 9, a computer 3 includes a CPU 101 configured to execute various types of arithmetic processing, an input device 102 configured to receive input data, a monitor 103, and a speaker 104. The computer 103 also includes a medium reading device 105 configured to read the program and the like from a storage medium, an interface device 106 to be connected to various devices, and a communication device 107 to be connected to and configured to communicate with an external device via a line or a wireless link. The computer 3 also includes a RAM 108 configured to temporarily store various types of information and a hard disk device 109. The units 101 to 109 included in the computer 3 are connected to a bus 110.

In the hard disk device 109, a program 111 for causing the computer 3 to execute the various processes of the functional sections that are the input sections 10 and 20, the training data generator 11, the model generator 12, the predictor 21, the error determiner 22, the output section 23, and the like, which are described in the embodiment, is stored. In the hard disk device 109, various types of data 112 to be referenced by the program 111 are stored. The input device 102 receives operational information entered by an operator of the computer 3, for example. The monitor 103 displays various screens on which the operator operates, for example. The interface device 106 is connected to a printing device or the like, for example. The communication device 107 is connected to a communication network such as a local area network (LAN) and communicates various types of information with an external device via the communication network.

The CPU 101 reads the program 111 stored in the hard disk device 109, loads the read program 111 into the RAM 108, and executes the program 111, thereby executing the various processes related to the input sections 10, 20, the training data generator 11, the model generator 12, the predictor 21, the error determiner 22, the output section 23, and the like. The program 111 may not be stored in the hard disk device 109. For example, the program 111 may be stored in a storage medium readable by the computer 3 and may be read by the computer 3 from the storage medium and executed by the computer 3. The storage medium readable by the computer 3 corresponds to a portable storage medium such as a CD-ROM, a DVD, or a Universal Serial Bus (USB) memory, a semiconductor memory such as a flash memory, a hard disk drive, or the like. Alternatively, the program 111 may be stored in a device connected to a public line, the Internet, a LAN, or the like and may be read by the computer 3 from the device and executed by the computer 3.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

dividing remaining training data items obtained by excluding a test data group from a plurality of training data items into a first training data group and a second training data group;

generating a learning model using learning data included in the first training data group;

calculating prediction accuracy of the learning model using the test data group;

executing a determination process for determining whether the calculated prediction accuracy is equal to or higher than a threshold;

when it is determined that the calculated prediction accuracy is not equal to or higher than the threshold, re-dividing the remaining data items into the first training data group and the second training data group so as to increase a ratio of the first training data group;

executing the determination process using the re-divided first training data group; and when it is determined that the calculated prediction accuracy is equal to or higher than the threshold, training an error prediction model for determining whether an error of a value predicted by the learning model satisfies a predetermined requirement by using the second training data group.

2. The storage medium according to claim 1, wherein the process further comprising determining a boundary requirement for a magnitude of the error of the predicted value as the predetermined requirement based on a data amount of the second training data group, the boundary requirement being a value to be used for generating of the error prediction model.

3. The storage medium according to claim 1, the process further comprising calculating the prediction accuracy of the error prediction model using the test data group,
wherein training the error prediction model includes changing the predetermined requirement for the error of the predicted value when the calculated prediction accuracy of the error prediction model does not a preset threshold.

4. The storage medium according to claim 1,
wherein the leaning model is generated by using linear regression, and
the generating includes calculating $w_k$ and C using a following equation, $$p_i = \sum_k w_k x_{ik} + C$$

wherein $p_i$ denotes a target variable, $w_k$ denotes a weight for a characteristic amount (k), $x_{ik}$ denotes an explanatory variable, and C denotes a constant term.

5. The storage medium according to claim 4,
wherein the $p_i$ indicates a price of a component (i), and the $x_{ik}$ indicates a value of the characteristic amount (k) of the component (i).

6. A learning method to be executed by a processor included in a learning device, the learning method comprising:
dividing remaining training data items obtained by excluding a test data group from a plurality of training data items into a first training data group and a second training data group;
generating a learning model using learning data included in the first training data group;
calculating prediction accuracy of the learning model using the test data group;
executing a determination process for determining whether the calculated prediction accuracy is equal to or higher than a threshold;
when it is determined that the calculated prediction accuracy is not equal to or higher than the threshold, re-dividing the remaining data items into the first training data group and the second training data group so as to increase a ratio of the first training data group;
executing the determination process using the re-divided first training data group; and
when it is determined that the calculated prediction accuracy is equal to or higher than the threshold, training an error prediction model for determining whether an error of a value predicted by the learning model satisfies a predetermined requirement by using the second training data group.

7. The learning method according to claim 6, further comprising
determining a boundary requirement for a magnitude of the error of the predicted value as the predetermined requirement based on a data amount of the second training data group, the boundary requirement being a value to be used for generating of the error prediction model.

8. The learning method according to claim 6, further comprising
calculating the prediction accuracy of the error prediction model using the test data group,
wherein training the error prediction model includes changing the predetermined requirement for the error of the predicted value when the calculated prediction accuracy of the error prediction model does not satisfy a preset threshold.

9. A learning device comprising:
a memory; and
a processor coupled to the memory and configured to:
divide remaining training data items obtained by excluding a test data group from a plurality of training data items into a first training data group and a second training data group,
generate a learning model using learning data included in the first training data group,
calculate prediction accuracy of the learning model using the test data group,
execute a determination process for determining whether the calculated prediction accuracy is equal to or higher than a threshold,
when it is determined that the calculated prediction accuracy is not equal to or higher than the threshold, re-divide the remaining data items into the first training data group and the second training data group so as to increase a ratio of the first training data group,
execute the determination process using the re-divided first training data group, and
when it is determined that the calculated prediction accuracy is equal to or higher than the threshold, train an error prediction model for determining whether an error of a value predicted by the learning model satisfies a predetermined requirement by using the second training data group.

10. The learning device according to claim 9,
wherein the processor is configured to determine a boundary requirement for a magnitude of the error of the predicted value as the predetermined requirement based on a data amount of the second training data group, the boundary requirement being a value to be used for generating of the error prediction model.

11. The learning device according to claim 9, wherein the processor is configured to:
calculate the prediction accuracy of the error prediction model using the test data group; and
change the predetermined requirement when the calculated prediction accuracy of the error prediction model does not satisfy a preset threshold.

12. A predicting device comprising:
a memory; and
a processor coupled to the memory and configured to:
receive input data targeted for prediction,
input the input data targeted for prediction to a learning model and acquire a value predicted for the input data,
input the input data targeted for prediction to an error prediction model configured to determine whether an error of a value predicted by the learning model satisfies a predetermined requirement, and acquire a result of determining an error of the value predicted for the input data, and
output the acquired predicted value and the acquired result of determining the error of the predicted value,
wherein the learning model is generated by:
dividing remaining training data items obtained by excluding a test data group from a plurality of training data items into a first training data group and a second training data group, and
training using learning data included in the first training data group, wherein the error prediction model is generated by:
  calculating prediction accuracy of the learning model using the test data group,
  executing a determination process for determining whether the calculated prediction accuracy is equal to or higher than a threshold,
  re-dividing, when it is determined that the calculated prediction accuracy is not equal to or higher than the threshold, the remaining data items into the first training data group and the second training data group so as to increase a ratio of the first training data group,
  executing the determination process using the re-divided first training data group, and
  training using the second training data group when it is determined that the calculated prediction accuracy is equal to or higher than the threshold.

* * * * *